US012238376B2

(12) United States Patent
Cormican et al.

(10) Patent No.: US 12,238,376 B2
(45) Date of Patent: Feb. 25, 2025

(54) METHODS, SYSTEMS, AND MEDIA FOR PRESENTING CONTEXTUAL INFORMATION IN CONNECTION WITH MEDIA CONTENT

(71) Applicant: Google LLC, Mountain View, CA (US)

(72) Inventors: Neil Cormican, Menlo Park, CA (US); Christopher David Scott, San Francisco, CA (US); Andre Cunha, Belmont, CA (US); Kathryn Lee Smith, San Francisco, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 18/204,727

(22) Filed: Jun. 1, 2023

(65) Prior Publication Data

US 2023/0308722 A1    Sep. 28, 2023

Related U.S. Application Data

(63) Continuation of application No. 17/486,040, filed on Sep. 27, 2021, now Pat. No. 11,671,667, which is a
(Continued)

(51) Int. Cl.
*H04N 5/445* (2011.01)
*H04N 21/431* (2011.01)
(Continued)

(52) U.S. Cl.
CPC ..... *H04N 21/4622* (2013.01); *H04N 21/4316* (2013.01); *H04N 21/4722* (2013.01);
(Continued)

(58) Field of Classification Search
CPC ........... H04N 21/4622; H04N 21/4316; H04N 21/4722; H04N 21/478; H04N 21/482; H04N 21/8133
(Continued)

(56) References Cited

U.S. PATENT DOCUMENTS 5,929,849 A    7/1999 Kikinis
8,706,827 B1    4/2014 Noble et al.
(Continued)

OTHER PUBLICATIONS

Prosecution History from U.S. Appl. No. 15/842,217, now issued U.S. Pat. No. 11,134,312, dated Nov. 9, 2018 through May 26, 2021, 152 pp.
(Continued)

*Primary Examiner* — Jefferey F Harold
*Assistant Examiner* — Sahar Aqil Riaz
(74) *Attorney, Agent, or Firm* — Shumaker & Sieffert, P.A.

(57) ABSTRACT

Methods, systems, and media for presenting contextual information in connection with media content are provided. In some embodiments, the method comprises: causing a media content item to be presented on a user device; receiving, at a first time point from a user of the user device, a user input to display one or more contextual interfaces that present information related to the media content item; identifying a plurality of contextual interfaces based on content included in the media content item at the first time point; causing the media content item to be presented in a first portion of a display of the user device and causing a first contextual interface from the plurality of contextual interfaces to be presented in a second portion of the display of the user device; identifying, at a second time point, an update to the first contextual interface based on content included in the media content item at the second time point; and modifying the first contextual interface based on the update identified at the second time point.

21 Claims, 6 Drawing Sheets

Related U.S. Application Data continuation of application No. 15/842,217, filed on Dec. 14, 2017, now Pat. No. 11,134,312.

(51) Int. Cl.
| | |
|---|---|
| *H04N 21/462* | (2011.01) |
| *H04N 21/4722* | (2011.01) |
| *H04N 21/478* | (2011.01) |
| *H04N 21/482* | (2011.01) |
| *H04N 21/81* | (2011.01) |

(52) U.S. Cl.
CPC ......... *H04N 21/478* (2013.01); *H04N 21/482* (2013.01); *H04N 21/8133* (2013.01)

(58) Field of Classification Search
USPC .......................................................... 725/40
See application file for complete search history.

(56) References Cited

U.S. PATENT DOCUMENTS

| | | | |
|---|---|---|---|
| 9,082,092 B1 * | 7/2015 | Henry .................. | A63F 13/335 |
| 9,191,722 B2 | 11/2015 | Alexander et al. | |
| 9,798,457 B2 * | 10/2017 | Cupala .................. | A63F 13/235 |
| 9,830,061 B1 * | 11/2017 | Wheeler ............. | G06F 3/04847 |
| 10,254,928 B1 | 4/2019 | Jesensky et al. | |
| 10,303,289 B2 | 5/2019 | Sepulveda et al. | |
| 11,134,312 B2 | 9/2021 | Cormican et al. | |
| 11,269,890 B2 * | 3/2022 | Eatedali ............ | G06F 16/24575 |
| 11,416,540 B2 * | 8/2022 | Sanio ..................... | G06F 16/48 |
| 11,481,455 B2 * | 10/2022 | Skolicki ............. | G06F 16/9535 |
| 11,671,667 B2 | 6/2023 | Cormican et al. | |
| 2009/0328113 A1 * | 12/2009 | van de Klashorst | ........................ |
| | | | G06Q 30/0269 |
| | | | 725/87 |
| 2010/0310238 A1 | 12/2010 | Macrae et al. | |
| 2012/0158511 A1 * | 6/2012 | Lucero ............... | G06Q 30/0251 |
| | | | 705/14.64 |
| 2013/0174191 A1 | 7/2013 | Thompson et al. | |
| 2013/0347018 A1 * | 12/2013 | Limp ................. | H04N 21/4394 |
| | | | 725/19 |
| 2014/0033040 A1 | 1/2014 | Thomas et al. | |
| 2014/0282092 A1 * | 9/2014 | Riddell ................. | H04L 65/764 |
| | | | 715/753 |
| 2014/0333531 A1 | 11/2014 | Phang et al. | |
| 2014/0337346 A1 * | 11/2014 | Barthel ................... | G06F 16/45 |
| | | | 707/738 |
| 2015/0128046 A1 | 5/2015 | Cormican et al. | |
| 2015/0149583 A1 | 5/2015 | Chung | |
| 2016/0014482 A1 | 1/2016 | Chen et al. | |
| 2016/0050462 A1 | 2/2016 | Sirpal et al. | |
| 2016/0094875 A1 | 3/2016 | Peterson et al. | |
| 2016/0182854 A1 * | 6/2016 | Suzuki ............... | H04N 21/4223 |
| | | | 348/14.07 |
| 2016/0255379 A1 * | 9/2016 | Langan ............... | H04N 21/4825 |
| | | | 725/88 |
| 2016/0286283 A1 | 9/2016 | Oku | |
| 2016/0291802 A1 | 10/2016 | Beck et al. | |
| 2017/0193501 A1 | 7/2017 | Cole et al. | |
| 2017/0206251 A1 * | 7/2017 | Eatedali ............. | G06F 16/2358 |
| 2017/0300187 A1 | 10/2017 | Lee et al. | |
| 2017/0303002 A1 * | 10/2017 | Esayian, Jr. ....... | H04N 21/2743 |
| 2018/0367840 A1 | 12/2018 | Kleinerman et al. | |

OTHER PUBLICATIONS

Prosecution History from U.S. Appl. No. 17/486,040, now issued U.S. Pat. No. 11,671,667, dated Sep. 23, 2022 through Jan. 25, 2023, 26 pp.
Notice of Allowance dated Jan. 25, 2023 in U.S. Appl. No. 17/486,040.
Notice of Allowance dated May 26, 2021 in U.S. Appl. No. 15/842,217.
Office Action dated Mar. 19, 2020 in U.S. Appl. No. 15/842,217.
Office Action dated May 22, 2019 in U.S. Appl. No. 15/842,217.
Office Action dated Sep. 10, 2019 in U.S. Appl. No. 15/842,217.
Office Action dated Sep. 23, 2022 in U.S. Appl. No. 17/486,040.
Office Action dated Nov. 9, 2018 in U.S. Appl. No. 15/842,217.
Office Action dated Nov. 23, 2020 in U.S. Appl. No. 15/842,217.

* cited by examiner

METHODS, SYSTEMS, AND MEDIA FOR PRESENTING CONTEXTUAL INFORMATION IN CONNECTION WITH MEDIA CONTENT

CROSS-REFERENCE TO RELATED APPLICATIONS

This application is a continuation of U.S. patent application Ser. No. 17/486,040, filed Sep. 27, 2021, which is a continuation of U.S. patent application Ser. No. 15/842,217, filed Dec. 14, 2017, each of which is hereby incorporated by reference herein in its entirety.

TECHNICAL FIELD

Disclosed subject matter relates to methods, systems, and media for presenting contextual information in connection with media content.

BACKGROUND

Users often want to interact with relevant content while viewing media content, such as television programs or movies. For example, a user viewing a television show may be interested in searching for information about an actor in the television show, chatting with friends who are also viewing the television show, identifying music included in a soundtrack of the television show, etc. However, it can be difficult and time-consuming for a user to navigate to different applications while viewing the media content. For example, a user who wants to chat with friends about a television show and identify music included in the soundtrack may need to open multiple applications while viewing the television show, which can be time-consuming to the user and distract the user from the media content being presented.

In a particular example, set-top boxes and other media rendering devices are often underpowered and rudimentary devices that offers limited interactive opportunities. If the user wishes to interact or engage with the media content being presented, such a user would access a third party service, such as a social media application, a search application, or another suitable application.

Accordingly, it is desirable to provide new methods, systems, and media for presenting contextual information in connection with media content.

SUMMARY

Methods, systems, and media for presenting contextual information in connection with media content are provided.

In accordance with some embodiments of the disclosed subject matter, a method for presenting contextual information in connection with media content is provided, the method comprising: causing a media content item to be presented on a user device; receiving, at a first time point from a user of the user device, a user input to display one or more contextual interfaces that present information related to the media content item; identifying a plurality of contextual interfaces based on content included in the media content item at the first time point; causing the media content item to be presented in a first portion of a display of the user device and causing a first contextual interface from the plurality of contextual interfaces to be presented in a second portion of the display of the user device; identifying, at a second time point, an update to the first contextual interface based on content included in the media content item at the second time point; and modifying the first contextual interface based on the update identified at the second time point.

In some embodiments, the method further comprises detecting an item that appears in the media content item at the first time point, wherein the first contextual interface presents information relating to the item.

In some embodiments, the method further comprises, in response to receiving a second user input, causing presentation of the first contextual interface to be inhibited and causing a second contextual interface of the plurality of contextual interfaces to be presented in the second portion of the display of the user device. In some embodiments, the second contextual interface includes a messaging interface for presenting messages received from one or more users other than the user of the user device.

In some embodiments, identifying the plurality of contextual interfaces based on the content included in the media content item at the first time point is further based on metadata associated with the media content item. In some embodiments, the metadata associated with the media content item includes a score indicating a likelihood that the user of the user device will be interested in the content included in the media content item at the first time point.

In some embodiments, the method further comprises modifying the plurality of contextual interfaces available for presentation by the user device based on user engagement information associated with the first contextual interface.

In accordance with some embodiments of the disclosed subject matter, a system for presenting contextual information in connection with media content is provided, the system comprising a memory and a hardware processor that, when executing computer executable instructions stored in the memory, is configured to: cause a media content item to be presented on a user device; receive, at a first time point from a user of the user device, a user input to display one or more contextual interfaces that present information related to the media content item; identify a plurality of contextual interfaces based on content included in the media content item at the first time point; cause the media content item to be presented in a first portion of a display of the user device and causing a first contextual interface from the plurality of contextual interfaces to be presented in a second portion of the display of the user device; identify, at a second time point, an update to the first contextual interface based on content included in the media content item at the second time point; and modify the first contextual interface based on the update identified at the second time point.

In accordance with some embodiments of the disclosed subject matter, a non-transitory computer-readable medium containing computer executable instructions that, when executed by a processor, cause the processor to perform a method for presenting contextual information in connection with media content is provided, the method comprising: causing a media content item to be presented on a user device; receiving, at a first time point from a user of the user device, a user input to display one or more contextual interfaces that present information related to the media content item; identifying a plurality of contextual interfaces based on content included in the media content item at the first time point; causing the media content item to be presented in a first portion of a display of the user device and causing a first contextual interface from the plurality of contextual interfaces to be presented in a second portion of the display of the user device; identifying, at a second time point, an update to the first contextual interface based on content included in the media content item at the second time point; and modifying the first contextual interface based on the update identified at the second time point.

In accordance with some embodiments of the disclosed subject matter, a system for presenting contextual information in connection with media content is provided, the system comprising: means for causing a media content item to be presented on a user device; means for receiving, at a first time point from a user of the user device, a user input to display one or more contextual interfaces that present information related to the media content item; means for identifying a plurality of contextual interfaces based on content included in the media content item at the first time point; means for causing the media content item to be presented in a first portion of a display of the user device and causing a first contextual interface from the plurality of contextual interfaces to be presented in a second portion of the display of the user device; means for identifying, at a second time point, an update to the first contextual interface based on content included in the media content item at the second time point; and means for modifying the first contextual interface based on the update identified at the second time point.

BRIEF DESCRIPTION OF THE DRAWINGS

Various objects, features, and advantages of the disclosed subject matter can be more fully appreciated with reference to the following detailed description of the disclosed subject matter when considered in connection with the following drawings, in which like reference numerals identify like elements.

DETAILED DESCRIPTION

Figure 1A:
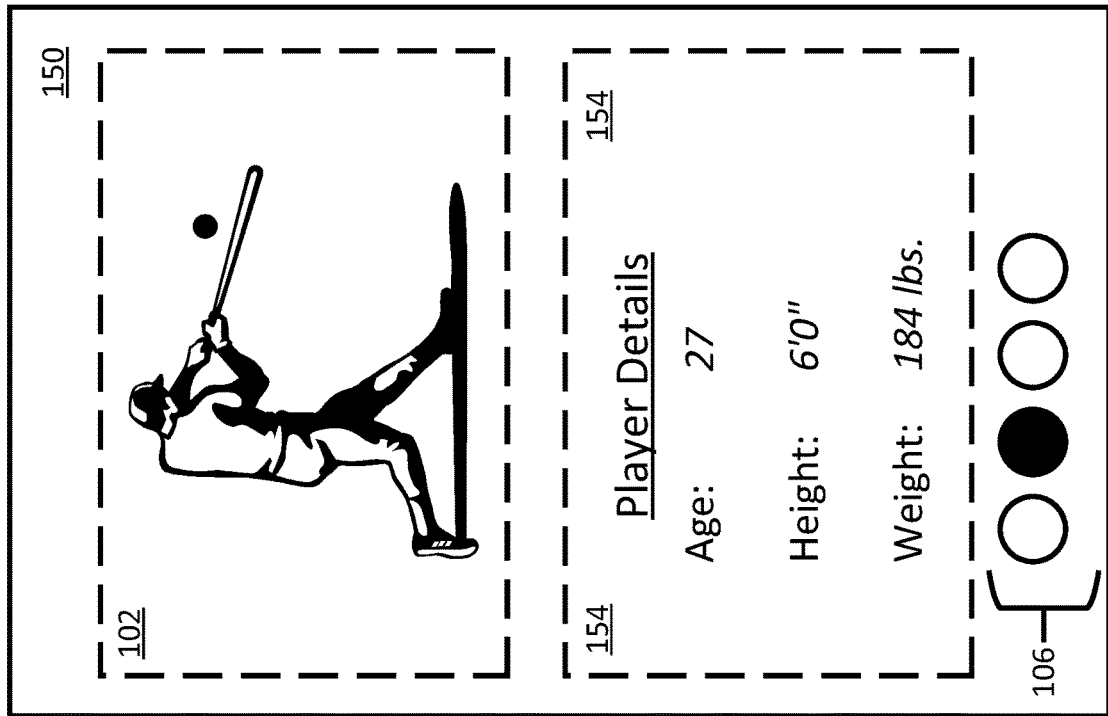
FIGS. 1A and 1B show example user interfaces for presenting contextual information associated with a media content item in accordance with some embodiments of the disclosed subject matter.

In accordance with various embodiments, mechanisms (which can include methods, systems, and media) for presenting contextual information in connection with media content are provided.

In some embodiments, the mechanisms described herein can cause a media content item to be presented on a user device and can cause one or more contextual interfaces of information relevant to the media content item to be presented on the user device in connection with the media content item. For example, in some embodiments, the contextual interfaces can indicate information associated with the media content item.

As a more particular example, in instances where the media content item is a television show or a movie, the contextual interfaces can indicate information about particular actors, information about a director of the television show or the movie, information about a song included in a soundtrack of the television show or the movie, and/or any other suitable information. As another more particular example, in instances where the media content item is a sports event, the contextual interfaces can include information such as statistics about a particular team or player, and/or any other suitable type of information. As another example, in some embodiments, the contextual interfaces can include one or more options to view additional content associated with the media content and/or to manipulate playback of the media content item. As a more particular example, in some embodiments, a contextual interface can include an option to replay a particular highlight included in the media content item. As a specific example, in instances where the media content item is a sports event, the mechanisms can determine that a particular event has occurred (e.g., a goal, and/or any other suitable type of event), and can present a contextual interface that suggests that a user replay the portion of the media content item that includes the identified event. As yet another example, in some embodiments, the contextual interfaces can include interfaces for social interaction with other users in connection with the media content item. As a more particular example, in some embodiments, a contextual interface can include a messaging interface that can allow a user of the contextual interface to participate in a chat with other users viewing the media content item. As another more particular example, in some embodiments, a contextual interface can aggregate messages received in connection with a social networking service that are determined to be relevant to the media content item (e.g., based on a hashtag associated with each of the messages, based on text included in the messages, and/or based on any other suitable information).

In some embodiments, the contextual interfaces can be presented in any suitable manner. For example, in some embodiments, a media player window in which the media content item is being presented can be minimized in any suitable manner (e.g., presented in a half-screen view on a display of the user device, and/or minimized in any other suitable manner), and the contextual interfaces can be presented in a remaining portion of the display. Additionally, in some embodiments, a group of contextual interfaces can be identified, and a user of the user device can navigate through the group of contextual interfaces. For example, a set of selected contextual interfaces can be positioned in a remaining portion of the display, where gestures received from a user input device can navigate through the selected contextual interfaces. In another example, based on a type of contextual interface, a set of selected contextual interfaces can be superimposed onto the media content item being currently presented, wherein the contextual interfaces have a particular transparency level such that information contained in a contextual interface and the media content item can be concurrently presented.

In some embodiments, the contextual interfaces can be identified and generated based on any suitable information. For example, in some embodiments, a media content item that is presented on a user device with which the contextual information is associated can be transmitted to the user device in connection with metadata that indicates any suitable information. As a more particular example, in some embodiments, the metadata can indicate time points within the media content item at which particular highlights occur (e.g., a scored goal, a dunk in a basketball game, a dramatic event in a television show, and/or any other suitable event), time points at which a particular actor or character appears within the media content item, time points at which particular items or objects appear (e.g., particular ingredients in a cooking show, particular clothing items worn by a character in a television show, and/or any other suitable items or objects), time points at which the media content item takes place in particular geographic locations, and/or any other suitable information. In some such embodiments, the mechanisms can determine that the metadata indicates that a particular event will occur in an upcoming portion of the media content item or that a particular item or object will occur in an upcoming portion of the media content item, and can identify and generate a corresponding contextual interface based on the metadata to be presented during presentation of the upcoming portion of the media content item. In some embodiments, the mechanisms can use the metadata to continually update presented contextual interfaces to indicate and highlight to a user viewing a media content item particular information likely to be of interest to the user. Similarly, in some embodiments, the mechanisms can use metadata associated with a second media content item to begin presenting relevant contextual information if the user causes the second media content item to begin being presented.

Note that, although the contextual interfaces are generally described herein as being presented on the user device on which the media content item is being presented, in some embodiments, the contextual interfaces can be presented on a second user device. For example, in some embodiments, the media content item can be presented on a television, and the contextual interfaces can be presented on a mobile phone, tablet computer, or other user device. In another example, in some embodiments, the media content item can be presented on a media playback device and the contextual interfaces can be presented on one or more user devices that are connected to the media playback device over a local area network. In some such embodiments, the multiple user devices can be associated in any suitable manner as described hereinbelow in connection with FIG. 6.

Figure 1B:
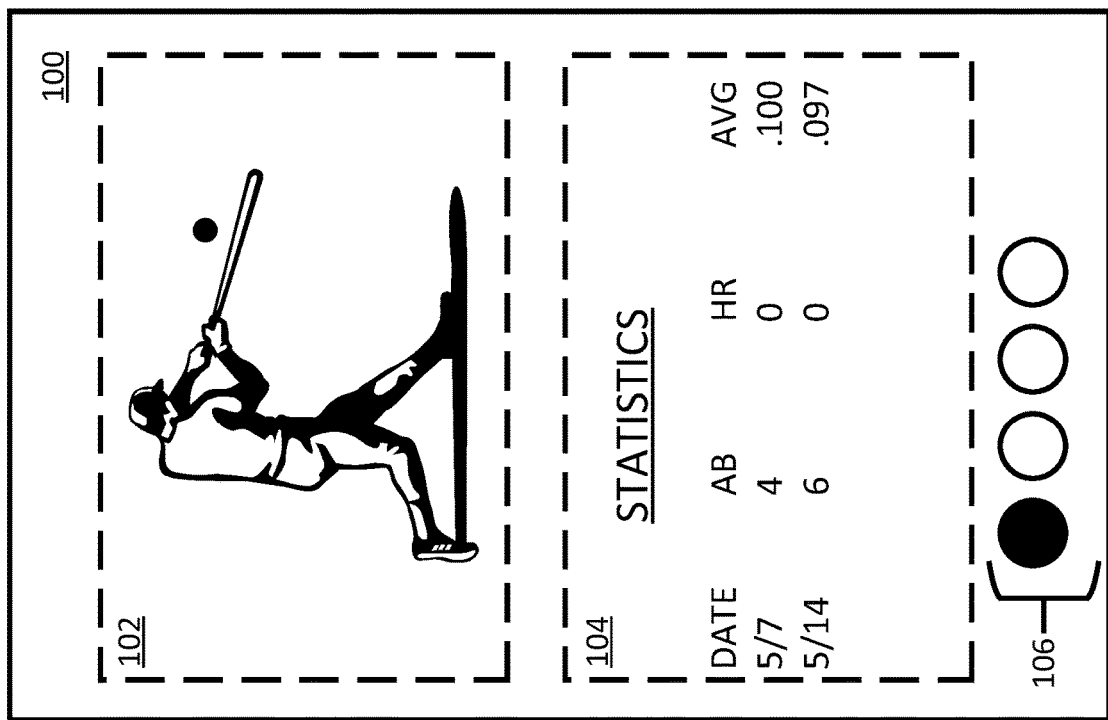

Turning to FIGS. 1A and 1B, examples 100 and 150 of user interfaces for presenting contextual information related to a media content item in accordance with some embodiments of the disclosed subject matter are shown.

As illustrated, user interfaces 100 and 150 can include a media content item 102 that is being presented on a user device. In some embodiments, media content item 102 can be any suitable type of media content, such as video content (e.g., a television program, a movie, live-streamed video content, a video, and/or any other suitable type of video content), audio content (e.g., music, a podcast, a radio program, an audiobook, and/or any other suitable type of audio content), a video chat, and/or any other suitable type of media content. In some embodiments, media content item 102 can be presented in a video player window that can include any suitable video player controls (e.g., a pause button, a fast-forward button, a rewind button, volume controls, and/or any other suitable type of controls).

User interfaces 100 and 150 can include interfaces 104 and 154, respectively, which indicate contextual information related to media content item 102. For example, as shown in FIG. 1A, in instances where media content item 102 relates to a sports event, interface 104 can show information indicating statistics of a particular team. As another example, as shown in FIG. 1B, in instances where media content item 102 relates to a sports game, interface 154 can show information about a particular player. Note that, in some embodiments, interfaces 104 and/or 154 can show any suitable contextual information related to media content item 102. For example, in some embodiments, interfaces 104 and/or 154 can show geographic information (e.g., a map indicating locations associated with media content item 102, and/or any other suitable geographic information), background information relating to media content item 102 (e.g., information about a topic related to media content item 102, answers to popular questions related to media content item 102, and/or any other suitable type of background information), retail information (e.g., links to products available for purchase that are related to media content item 102, and/or any other suitable retail information), and/or any other suitable information. Additional illustrative examples of contextual information that can be presented in interfaces 104 and/or 154 are described below in connection with block 606 of FIG. 6.

In some embodiments, a user of user interface 100 and/or 150 can navigate between interfaces 104, 154, and/or any other interfaces. For example, in some embodiments, in instances where multiple interfaces (e.g., two, three, five, ten, and/or any other suitable number) are available, a user can swipe on a currently presented interface (e.g., swipe left, swipe right, and/or in any other suitable direction) to cause a next or previous interface to be presented on the user device. Additionally, in some embodiments, an interface indicator 106 can indicate a number of available interfaces and/or which interface of the available interfaces is currently being presented. For example, as shown in FIGS. 1A and 1B, interface indicator 106 can include a group of icons (e.g., circles, and/or any other suitable icon), where the number of icons in the group of icons corresponds to the number of available interfaces. As another example, as shown in FIGS. 1A and 1B, in some embodiments, one icon in the group of icons can be highlighted in any suitable manner (e.g., shown as a filled in icon, presented in a different color, presented in a larger size, and/or highlighted in any other suitable manner) to indicate which interface of the available interfaces is currently being presented.

Figure 2B:
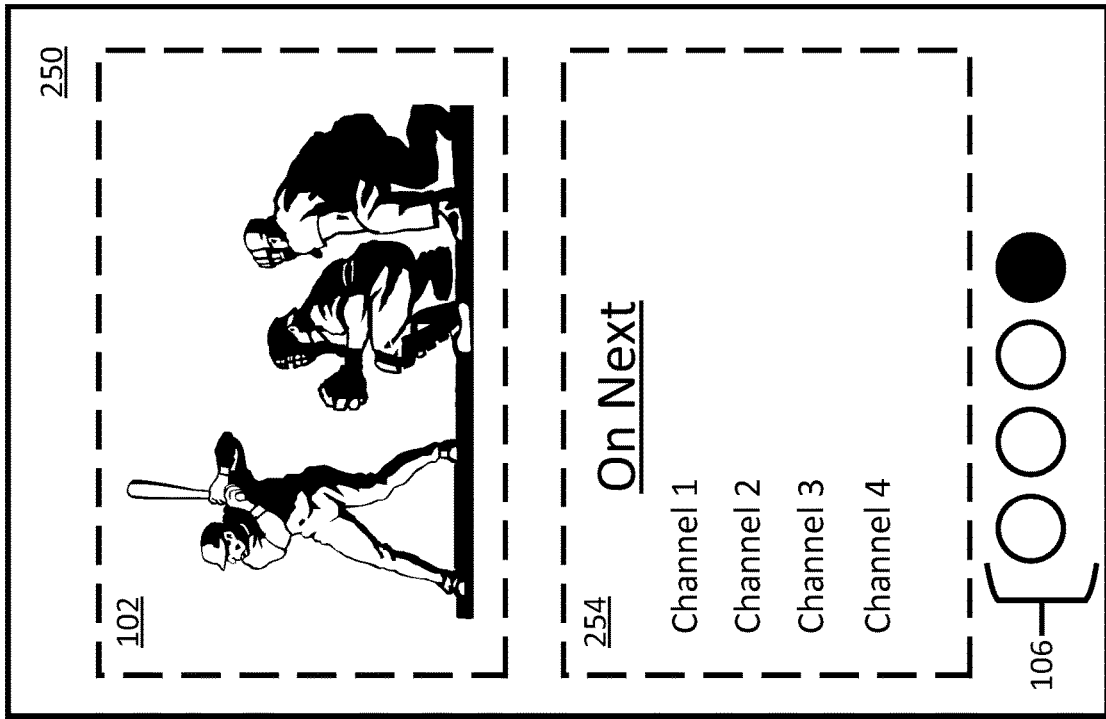
FIGS. 2A and 2B show example user interfaces for presenting options to control playback of a media content item in accordance with some embodiments of the disclosed subject matter.
Figure 2A:
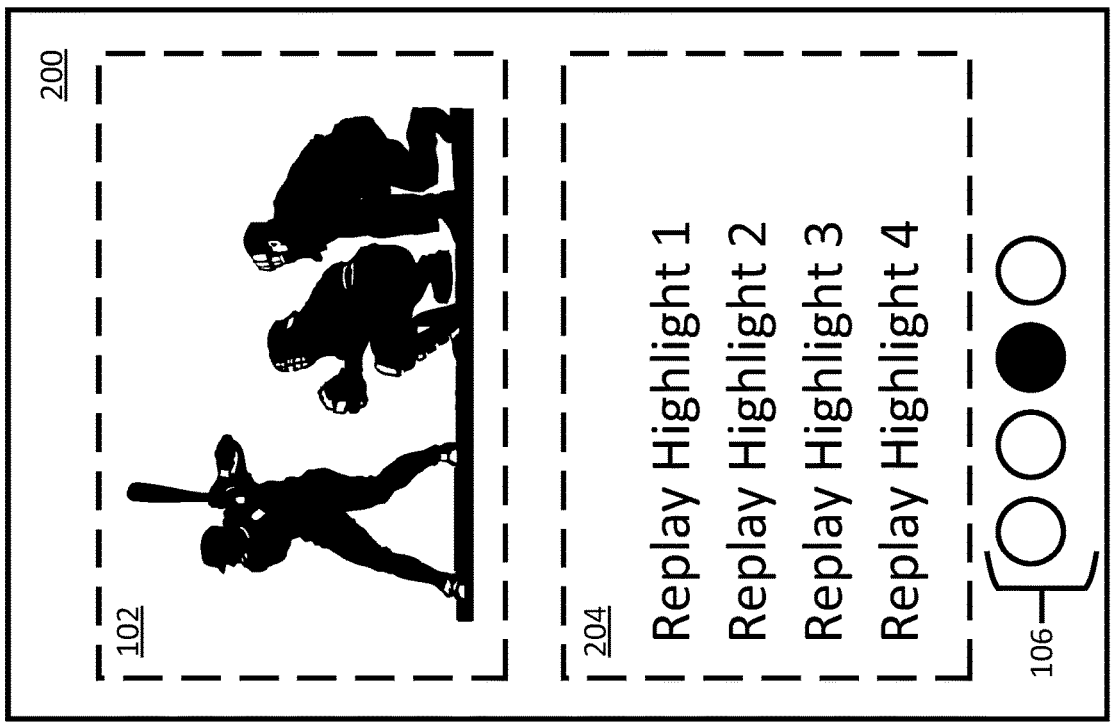

In some embodiments, contextual interfaces can be presented that can allow a user to manipulate playback of a media content item on a user device or select a different media content item for presentation on the user device, as shown in user interfaces 200 and 250 of FIGS. 2A and 2B.

As shown in FIG. 2A, contextual interface 204 can present an option to replay a particular portion of media content item 102. For example, in instances where media content item 102 is a sports game, contextual interface 204 can present an option to replay a recent highlight of the game (e.g., a recent home run, a recent touchdown, and/or any other suitable recent highlight). As a more particular example, in some embodiments, contextual interface 204 can present an option to replay a recent highlight in slow motion, with captions, and/or with any other suitable special effects. In some embodiments, contextual interface 204 can present indications of multiple highlights, and a user of contextual interface 204 can select a particular highlight from the multiple highlights to be replayed. In some embodiments, the portion of the media content item that includes a highlight can be automatically identified, as described below in connection with FIG. 6.

As shown in FIG. 2B, contextual interface 254 can present options of other media content items that are currently available or that will become available. For example, in some embodiments, contextual interface 254 can present information indicating media content items that are available on particular channels at a current time. As another example, in some embodiments, contextual interface 254 can present information indicating media content items that will become available at a particular time in the future. As yet another example, in some embodiments, contextual interface 254 can present information indicating media content items that are related to media content item 102. As a more particular example, in some embodiments, contextual interface 254 can present information indicating media content items that are related to a similar topic as media content item 102. As another more particular example, in some embodiments, in instances where media content item 102 is a television show, contextual interface 254 can present indications of other episodes of the television show. As yet another more particular example, in some embodiments, in instances where media content item 102 includes live-streamed news coverage of an event, contextual interface 254 can present indications of other coverage of the event.

Note that, in some embodiments, selection of an indication within contextual interface 254 can cause a corresponding media content item to be presented. For example, in some embodiments, presentation of media content item 102 can be stopped and a selected media content item from contextual interface 254 can begin being presented in a video player window in which media content item 102 was previously presented on the user device.

Figure 3B:
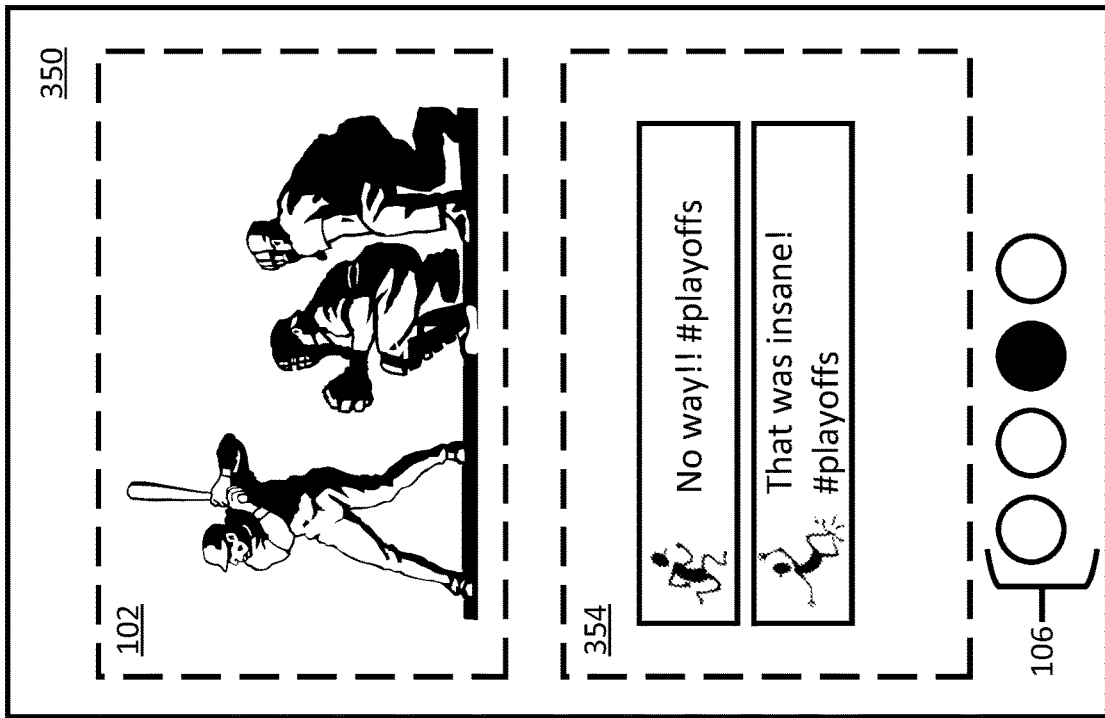
FIGS. 3A and 3B show example user interfaces for social interaction in connection with a media content item in accordance with some embodiments of the disclosed subject matter.
Figure 3A:
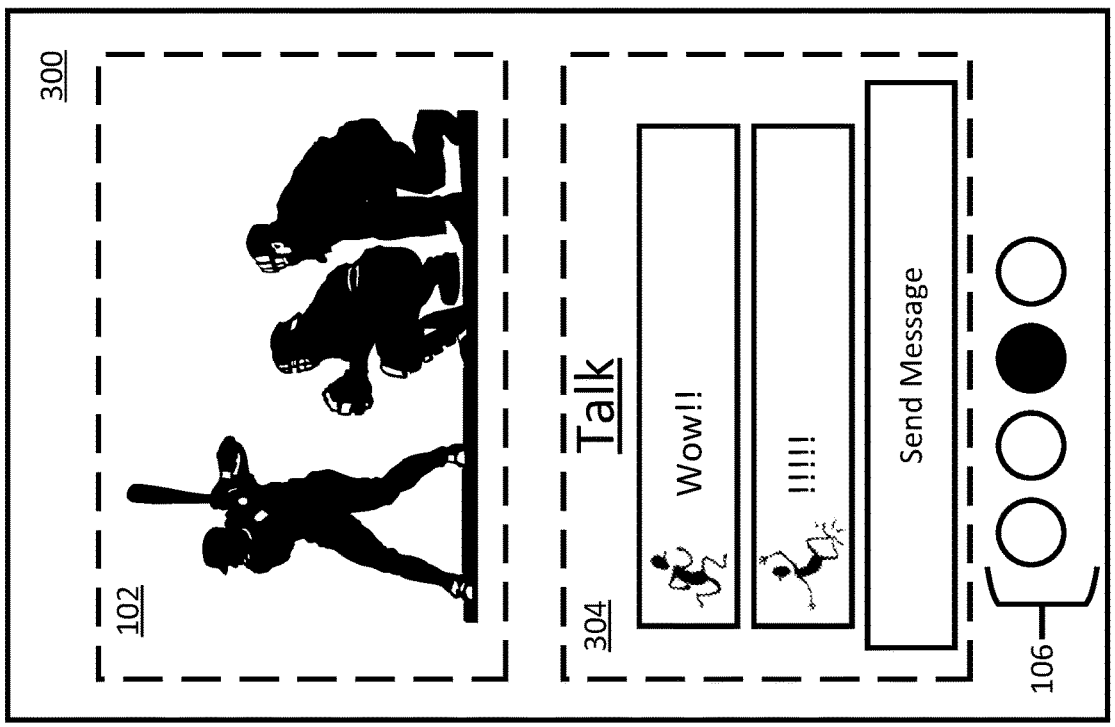

In some embodiments, contextual interfaces can be presented that allow a user of the user device to interact with other users in relation to media content item, as shown in user interfaces 300 and 350 of FIGS. 3A and 3B.

For example, as shown in FIG. 3A, in some embodiments, a contextual interface 304 can include a messaging interface that can present messages received from other users in connection with media content item 102. Additionally, in some embodiments, contextual interface 304 can include an input (e.g., a text input window, and/or any other suitable type of input) to allow a user of the user device to transmit a message to other users in connection with media content item 102. In some embodiments, the users associated with messages in the messaging interface shown in contextual interface 304 can be part of any suitable group, such as a group chat initiated by a user in the group in connection with media content item 102. In some embodiments, messages shown in contextual interface 304 can be linked with timing information associated with media content item 102 in any suitable manner. For example, in some embodiments, a playback position associated with presentation of media content item 102 can be stored in association with a message and/or in association with a timestamp at which a message was transmitted. Note that, although only text messages are shown in FIG. 3A, in some embodiments, the messages can include any suitable type of content, such as icons, graphics, animations, links, videos, and/or any other suitable type of content.

As another example, as shown in FIG. 3B, in some embodiments, a contextual interface 354 can present messages or posts from any suitable social networking service that are related to media content item 102. In some embodiments, the messages or posts can be identified based on any suitable content, such as hashtags that are determined to be related to media content item 102 (as shown in FIG. 3B), text in the messages or posts that are determined to be related to media content item 102, a geographic location associated with the messages or posts that is determined to be related to media content item 102, and/or identified in any other suitable manner. For example, in instances where media content item 102 relates to a particular sports event, the messages or posts can be ones that include text or hashtags that reference the particular event (e.g., "#nbaplayoffs, "Super Bowl," and/or any other suitable text or hashtags). As another example, in instances where media content item 102 relates to coverage of a particular event, the messages or posts can be ones that were transmitted or posted from geographic locations related to the event. Note that, in some embodiments, the posts collated from one or more social networking services can be posted by any suitable users, for example, users that are connected to a user of the user device in a social networking service, users that are not connected to the user of the user device, and/or any other suitable users.

Figure 4:
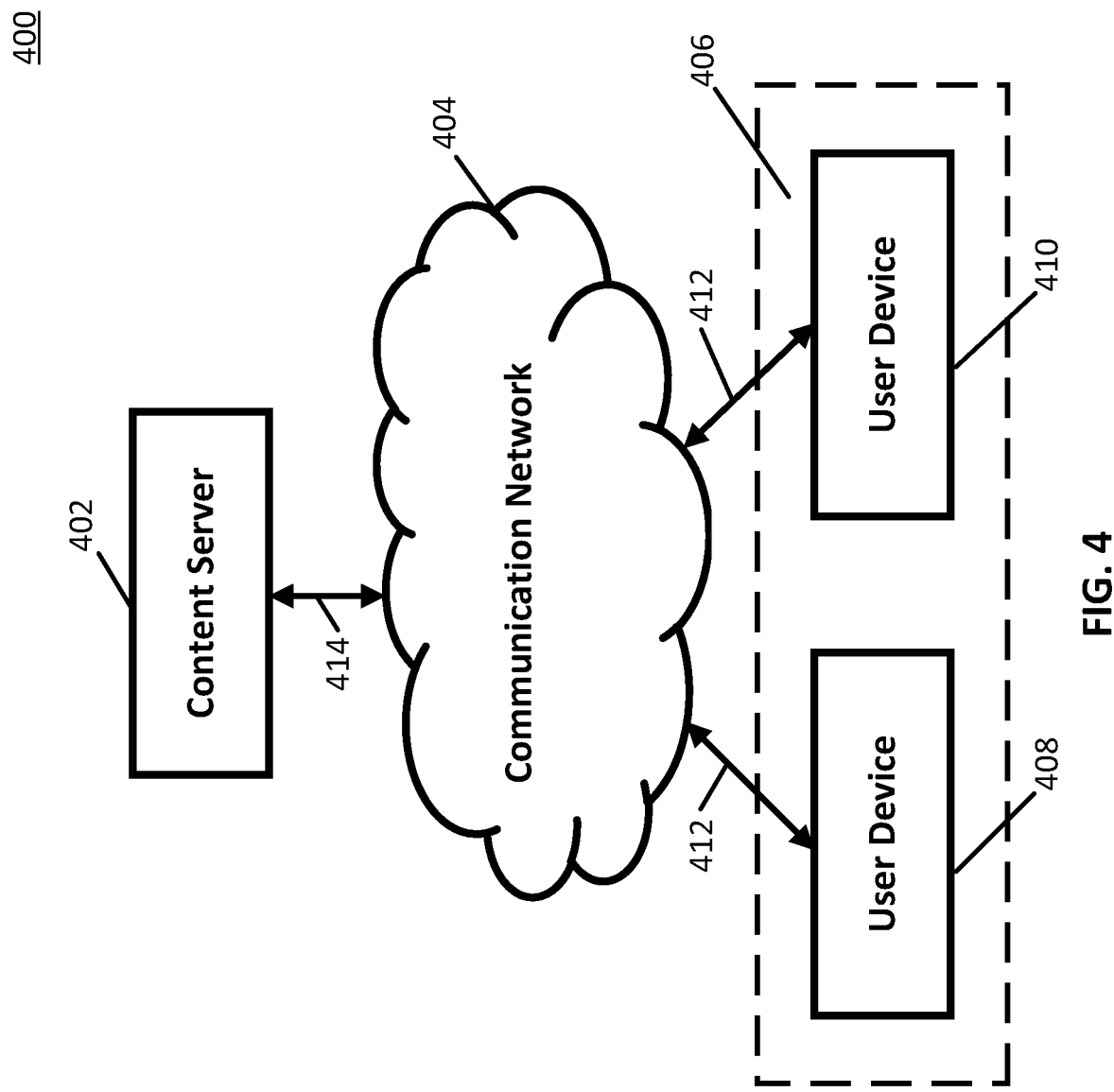
FIG. 4 shows a schematic diagram of an illustrative system suitable for implementation of mechanisms described herein for presenting contextual information in connection with media content in accordance with some embodiments of the disclosed subject matter.

Turning to FIG. 4, an example 400 of hardware for presenting contextual information in connection with media content that can be used in accordance with some embodiments of the disclosed subject matter is shown. As illustrated, hardware 400 can include a content server 402, a communication network 404, and/or one or more user devices 406, such as user devices 408 and 410.

Content server 402 can be any suitable server(s) for storing and/or providing media content to user devices 406. For example, in some embodiments, content server 402 can store media content, such as videos, television programs, movies, live-streamed media content, audio content, and/or any other suitable media content. In some embodiments, content server 402 can transmit media content to user devices 406, for example, via communication network 404. In some embodiments, server(s) 402 can additionally store information used to present contextual information related to media content being presented on a user device, as shown in and described above in connection with FIGS. 1A, 1B, 2A, 2B, 3A, and 3B.

Communication network 404 can be any suitable combination of one or more wired and/or wireless networks in some embodiments. For example, communication network 104 can include any one or more of the Internet, an intranet, a wide-area network (WAN), a local-area network (LAN), a wireless network, a digital subscriber line (DSL) network, a frame relay network, an asynchronous transfer mode (ATM) network, a virtual private network (VPN), and/or any other suitable communication network. User devices 406 can be connected by one or more communications links (e.g., communications links 412) to communication network 404 that can be linked via one or more communications links (e.g., communications links 414) to content server 402. The communications links can be any communications links suitable for communicating data among user devices 406 and content server 402 such as network links, dial-up links, wireless links, hard-wired links, any other suitable communications links, or any suitable combination of such links.

User devices 406 can include any one or more user devices suitable for requesting a media content item, presenting a media content item, presenting interfaces of contextual information related to the media content item, and/or any other suitable functions. For example, in some embodiments, user devices 406 can include a mobile device, such as a mobile phone, a tablet computer, a wearable computer, a laptop computer, a vehicle (e.g., a car, a boat, an airplane, or any other suitable vehicle) information or entertainment system, and/or any other suitable mobile device and/or any suitable non-mobile device (e.g., a desktop computer, and/or any other suitable non-mobile device). As another example, in some embodiments, user devices 406 can include a media playback device, such as a television, a projector device, a game console, desktop computer, and/or any other suitable non-mobile device.

Although content server 402 is illustrated as one device, the functions performed by content server 402 can be performed using any suitable number of devices in some embodiments. For example, in some embodiments, multiple devices can be used to implement the functions performed by content server 402.

Although two user devices 408 and 410 are shown in FIG. 4 to avoid over-complicating the figure, any suitable number of user devices, and/or any suitable types of user devices, can be used in some embodiments.

Figure 5:
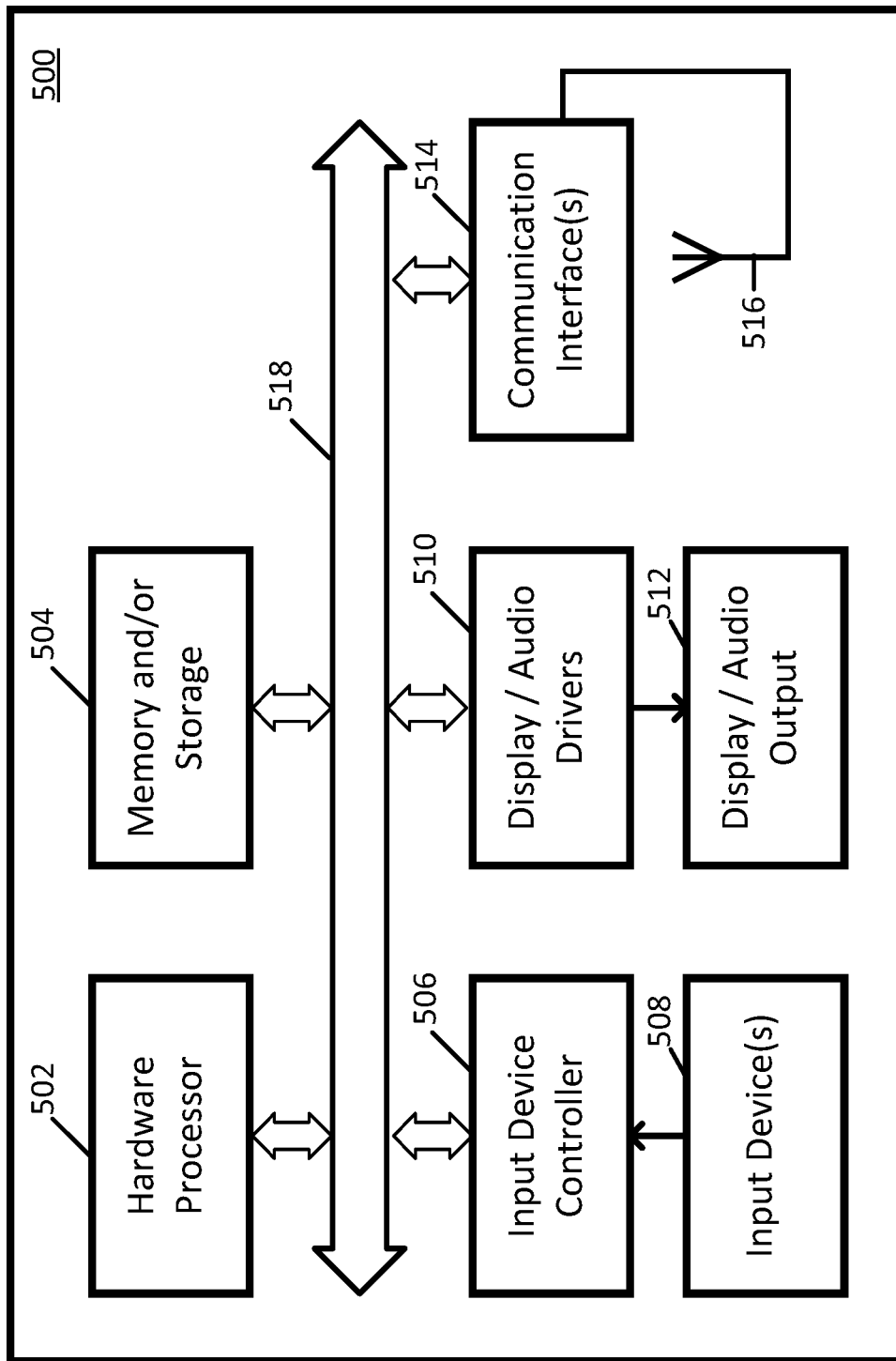
FIG. 5 shows a detailed example of hardware that can be used in a server and/or a user device of FIG. 4 in accordance with some embodiments of the disclosed subject matter.

Content server 402 and user devices 406 can be implemented using any suitable hardware in some embodiments. For example, in some embodiments, devices 402 and 406 can be implemented using any suitable general purpose computer or special purpose computer. For example, a mobile phone may be implemented using a special purpose computer. Any such general purpose computer or special purpose computer can include any suitable hardware. For example, as illustrated in example hardware 500 of FIG. 5, such hardware can include hardware processor 502, memory and/or storage 504, an input device controller 506, an input device 508, display/audio drivers 510, display and audio output circuitry 512, communication interface(s) 514, an antenna 516, and a bus 518.

Hardware processor 502 can include any suitable hardware processor, such as a microprocessor, a micro-controller, digital signal processor(s), dedicated logic, and/or any other suitable circuitry for controlling the functioning of a general purpose computer or a special purpose computer in some embodiments. In some embodiments, hardware processor 502 can be controlled by a server program stored in memory and/or storage 504 of a server (e.g., such as content server 402). For example, in some embodiments, the server program can cause hardware processor 402 to transmit a media content item to user device 406, transmit instructions for presenting contextual information related to the media content item, and/or performing any other suitable actions. In some embodiments, hardware processor 402 can be controlled by a computer program stored in memory and/or storage 504 of user device 406. For example, the computer program can cause hardware processor 402 to present a media content item, receive user input(s) to present contextual information related to the media content item, present contextual information in connection with the media content item, and/or perform any other suitable actions.

Memory and/or storage 504 can be any suitable memory and/or storage for storing programs, data, media content, and/or any other suitable information in some embodiments. For example, memory and/or storage 504 can include random access memory, read-only memory, flash memory, hard disk storage, optical media, and/or any other suitable memory.

Input device controller 506 can be any suitable circuitry for controlling and receiving input from one or more input devices 508 in some embodiments. For example, input device controller 506 can be circuitry for receiving input from a touchscreen, from a keyboard, from a mouse, from one or more buttons, from a voice recognition circuit, from a microphone, from a camera, from an optical sensor, from an accelerometer, from a temperature sensor, from a near field sensor, and/or any other type of input device.

Display/audio drivers 510 can be any suitable circuitry for controlling and driving output to one or more display/audio output devices 512 in some embodiments. For example, display/audio drivers 510 can be circuitry for driving a touchscreen, a flat-interface display, a cathode ray tube display, a projector, a speaker or speakers, and/or any other suitable display and/or presentation devices.

Communication interface(s) 514 can be any suitable circuitry for interfacing with one or more communication networks, such as network 404 as shown in FIG. 4. For example, interface(s) 514 can include network interface card circuitry, wireless communication circuitry, and/or any other suitable type of communication network circuitry.

Antenna 516 can be any suitable one or more antennas for wirelessly communicating with a communication network (e.g., communication network 404) in some embodiments. In some embodiments, antenna 516 can be omitted.

Bus 518 can be any suitable mechanism for communicating between two or more components 502, 504, 506, 510, and 514 in some embodiments.

Any other suitable components can be included in hardware 500 in accordance with some embodiments.

Figure 6:
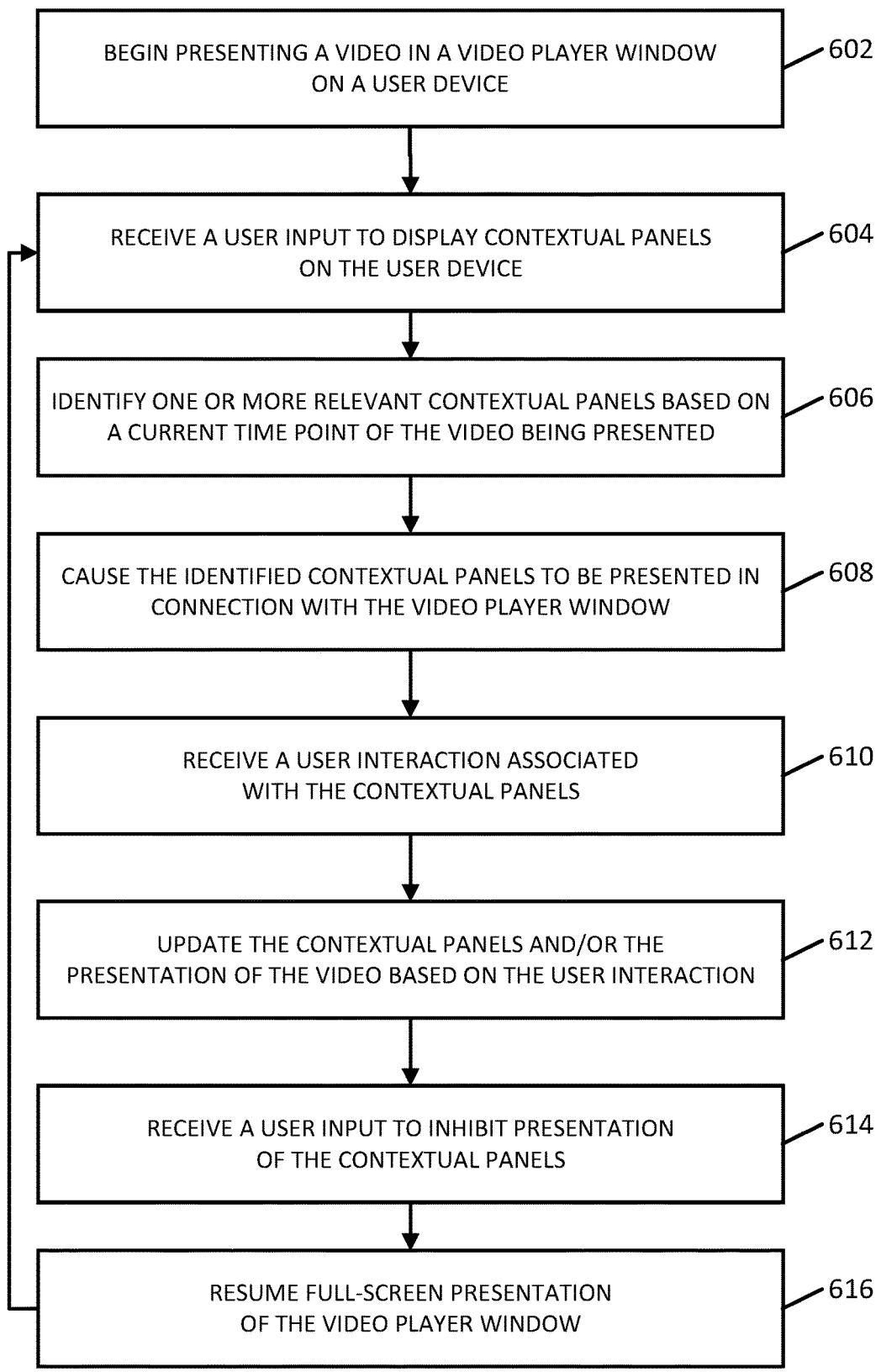
FIG. 6 shows an example of a process for presenting contextual information in connection with media content in accordance with some embodiments of the disclosed subject matter.

Turning to FIG. 6, an example 600 of a process for presenting contextual information in connection with media content in accordance with some embodiments of the disclosed subject matter is shown. In some embodiments, blocks of process 600 can be executed on a user device, for example, a user device presenting a media content item associated with the contextual information.

Process 600 can begin by presenting a media content item in a media player window on a user device. For example, as described above, in some embodiments, the media content item can be any suitable type of media content item, such as a video, a television show, a movie, live-streamed content, an audiobook, a podcast, music, and/or any other suitable type of content. In some embodiments, the user device can be any suitable type of user device, such as a mobile phone, a tablet computer, a desktop computer, a laptop computer, a television, and/or any other suitable type of user device. Note that, in some embodiments, the media content item can be presented on a display device that is paired with a user device that presents the contextual information. For example, in some embodiments, the media content item can be presented on a television that is associated with a mobile phone that presents the contextual information shown in and described above in connection with FIGS. 1A, 1B, 2A, 2B, 3A, and/or 3B. In some such embodiments, a first user device that presents the contextual information can be paired with a second user device that presents the media content item using any suitable technique or combination of techniques. For example, in some embodiments, a first user device (e.g., a mobile phone, tablet computer, or other user device) can detect a presence of a second user device (e.g., a television, and/or any other suitable user device). As a more particular example, in some embodiments, device discovery can be initiated using a network (e.g., a local area network, a WiFi network, a BLUETOOTH network, and/or any other suitable network) to which the first user device and the second user device are both connected. As a specific example, in some embodiments, a first user device can execute a discovery protocol, such as by transmitting a multicast message to all devices on a particular network requesting device details from the devices on the network, and can receive a response to the multicast message from the second user device.

In some embodiments, process 600 can begin presenting the media content item in response to any suitable input or information. For example, in some embodiments, process 600 can receive a selection of the media content item from a user of the user device. In some embodiments, process 600 can present the media content item in any suitable manner. For example, as described above in connection with FIGS. 1A and 1B, the media content item can be presented in a media player window that includes any suitable controls for playback of the media content item.

Process 600 can receive a user input to display one or more contextual interfaces on the user device at 604. In some embodiments, the user input can be any suitable type of user input. For example, in some embodiments, the user input can include swiping in a particular direction (e.g., left, right, up, down, and/or in any other suitable direction) on a touchscreen of the user device that causes the contextual interfaces to be presented on a display of the user device. As another example, in some embodiments, the user input can include selecting an icon presented on the user device.

In some embodiments, the user input can include selection of a portion of a screen in which a media player window is presented. For example, in response to determining that one or more contextual interfaces that are relevant to the media content being presented are available for presentation, a contextual interface bar can be positioned at a bottom portion of the screen in which the media player window is presented. In continuing this example, upon selecting the contextual interface bar (e.g., receiving a user selection of the contextual interface bar, receiving a gesture to a user input device to swipe the contextual interface bar in an upward direction, etc.), a contextual interface can be presented and, in some instances, the media player window can be reduced in size to accommodate the contextual interface.

At 606, process 600 can identify one or more contextual interfaces relevant to the media content item being presented on the user device. Process 600 can identify the one or more contextual interfaces using any suitable information. For example, in some embodiments, process 600 can identify the one or more contextual interfaces based on a type of content associated with the media content item being presented on the user device. As a more particular example, in instances where the media content item is a sports event, process 600 can identify contextual interfaces related to the particular type of sports event, such as contextual interfaces that indicate information associated with one or more teams, one or more players, and/or any other suitable type of relevant information, as shown in and described above in connection with FIGS. 1A and 1B. As another more particular example, in instances where the media content item is news coverage of a particular event, process 600 can identify contextual interfaces that present information related to the event, such as geographic information relevant to the event, indications of news articles related to the event, and/or any other suitable information.

As another example, in some embodiments, process 600 can identify the one or more contextual interfaces based on images, events, and/or audio content included within the presentation of the media content item. As a more particular example, in some embodiments, process 600 can identify a contextual interface that presents information about an item or object included in the media content item (e.g., a particular ingredient featured in a cooking show, an item of clothing worn by a character on a television show, and/or any other suitable item of object). As another more particular example, in some embodiments, process 600 can identify a contextual interface that presents information about a particular character or actor identified in the media content item (e.g., an identification of the character or actor, information about other media content the actor has appeared in, biographical information about the actor, and/or any other suitable information). As yet another more particular example, in some embodiments, process 600 can identify a contextual interface that allows a user to replay a portion of the media content item that includes a particular event, as shown in and described above in connection with FIG. 2A. As a specific example, in some embodiments, process 600 can identify a highlight in the media content item (e.g., a goal scored, a climactic event in a reality television series, and/or any other suitable highlight), and can identify a contextual interface that suggests that a user replay the highlight. In some such embodiments, the contextual interface can include options to replay the highlight in any suitable manner, such as in slow motion, with captions, and/or in any other suitable manner. As still another more particular example, in some embodiments, process 600 can identify a contextual interface based on audio content that is identified within the media content item. As a specific example, in some embodiments, process 600 can identify a contextual interface that indicates an identity of a song included in the media content item and can include any other suitable content, such as a link to buy the song.

Note that, in some embodiments, content included in the media content item at a particular time point can be identified in any suitable manner. For example, in some embodiments, the content can be identified based on metadata associated with the media content item (e.g., that is received in connection with the media content item from a server that transmits the metadata and the media content item to the user device, and/or metadata that is received in any other suitable manner). As a more particular example, in some embodiments, the metadata can indicate time points at which a particular item (e.g., a particular ingredient in a cooking show, and/or any other suitable item) is featured. As another more particular example, in some embodiments, the metadata can indicate time points at which a particular actor or character appear in the media content item. As yet another more particular example, in some embodiments, the metadata can indicate time points at which a particular song is included in audio content associated with the media content item. As still another more particular example, in some embodiments, a highlighted event (e.g., a goal, a dunk in a basketball game, a dramatic event in a television show, and/or any other suitable event) can be indicated in the metadata. In some embodiments, the metadata can be created by any suitable entity, such as a creator of the media content item, a channel associated with the media content item, a third-party entity, and/or any other suitable entity. In some embodiments, the metadata can include a score indicating a level of importance or interest associated with an object of interest, actor or character appearing in the media content item, and/or the highlighted event (e.g., a likelihood that a user will be interested in the object or the highlighted event) indicated by the metadata, and/or any other suitable information.

In some embodiments, process 600 can determine that a contextual interface is to be presented based on a determination that the metadata indicates that a particular item of interest is featured in an upcoming portion of the media content item, that a particular actor or character will appear in an upcoming portion of the media content item, that a highlighted event occurs in an upcoming portion of the media content item, and/or based on any other suitable information. Note that, in some embodiments, in instances where metadata includes a score that indicates a relative importance or likely level of interest of a user in a featured item or event, process 600 can determine whether to present a contextual interface based on the score. For example, in some embodiments, process 600 can identify a contextual interface for suggesting a replay if the score exceeds a predetermined threshold (e.g., that the relative importance is greater than 3 on a scale from 1 to 5, that there is a greater than 70% likelihood the user will be interested in the highlighted event, and/or any other suitable type of threshold). In some embodiments, the score can be assigned based on preferences of a user, for example, based on information indicating that a particular user enjoys watching replays of sports highlights more than replays of dramatic television show events, and/or any other suitable information.

Note that, in instances where the contextual interface suggests that a user of the user device replay a highlighted event (e.g., a scored goal, a dunk in a basketball game, a dramatic event in a television show, and/or any other suitable highlighted event), process 600 can create the replay by creating a subset of the media content item of any suitable duration (e.g., three seconds, five seconds, ten seconds, and/or any other suitable duration) that includes the highlighted event indicated by the metadata.

As yet another example, in some embodiments, process 600 can identify one or more contextual interfaces that can be used to change a currently presented media content item to a different media content item. For example, as shown in and described above in connection with FIG. 2B, process 600 can identify a contextual interface that indicates media content items available on particular channels, media content items similar to the media content item currently being presented, media content items that have been watched or endorsed by social connections of a user of the user device, and/or any other suitable media content items.

As still another example, in some embodiments, process 600 can identify one or more contextual interfaces that can be used for social interaction related to the media content item, as shown in and described above in connection with FIGS. 3A and 3B. As a more particular example, in some embodiments, process 600 can identify a contextual interface for presenting a messaging interface that allows a user to send and receive messages (e.g., text messages, instant messages, and/or any other suitable type of messages) from one or more users who are also viewing the media content item, as shown in and described above in connection with FIG. 3A. In some such embodiments, the contextual interface can additionally or alternatively allow a user to create a group of users to participate in a group chat using a messaging interface presented within the contextual interface by, for example, selecting one or more users. As another more particular example, in some embodiments, process 600 can identify a contextual interface for presenting messages received via any suitable social networking service that are related to the media content item. As a specific example, as shown in and described above in connection with FIG. 3B, the contextual interface can identify one or more messages corresponding to a particular social networking service as related to the media content item based on any suitable information, such as a hashtag included in the messages. In some embodiments, process 600 can identify the contextual interfaces used for social interaction based on any suitable information. For example, in some embodiments, process 600 can identify the contextual interfaces based on applications a user of the user device has installed on the user device. As a more particular example, in some embodiments, process 600 can identify a contextual interface used for a group chat using a particular chat application based on a determination that the user has installed the chat application on the user device. As another more particular example, in some embodiments, process 600 can identify a contextual interface for presenting messages associated with a particular social networking service based on a determination that the user has installed an application associated with the social networking service on the user device and/or based on a determination that the user has a user account associated with the social networking service.

As still another example, in some embodiments, process 600 can identify one or more contextual interfaces that can be used to allow a user of the user device to modify portions of the media content item. As a more particular example, in some embodiments, process 600 can identify a contextual interface that can include any suitable user interface controls that allow a user of the user device to use a camera (e.g., a front-facing camera associated with the user device, a web camera associated with the user device, and/or any other suitable camera) to swap a face captured by the camera with a face of a character appearing in the media content item. As another more particular example, in some embodiments, process 600 can identify a contextual interface that can include any suitable user interface controls that allow a user of the user device to draw on or otherwise annotate video presented on the user device.

As still another example, in some embodiments, process 600 can identify a contextual interface that allows a user to control a length of the media content item. For example, in instances where the media content item is a pre-recorded media content item (e.g., as opposed to live-streamed content), process 600 can allow the user to condense a presentation of the media content item by any suitable amount (e.g., half the duration, a third of the duration, and/or any other suitable amount). In some such embodiments, process 600 can cause the media content item to be condensed based on metadata associated with the media content item that indicate time points of highlighted events that occur within the media content item and/or a relative importance of highlighted events that occur within the media content item. For example, in some embodiments, in response to determining that a user wants to condense presentation of the media content item, process 600 can cause a condensed version of the media content item that includes primarily highlighted events indicated in the metadata to be generated. In some embodiments, a user of the user device can indicate via the contextual interface and/or in any other suitable manner (e.g., via a gesture such as pinching of a display, selection of a particular button, and/or in any other suitable manner) an amount by which the media content item is to be condensed (e.g., by half, and/or by any other suitable fraction) or a target duration of a condensed media content item (e.g., ten minutes, half an hour, and/or any other suitable duration), and process 600 can generate a condensed version of the media content item based on the indicated duration. For example, in instances where process 600 determines that the condensed version of the media content item is to be ten minutes in duration, process 600 can generate the condensed media content item by selecting a first subset of highlighted events (e.g., based on scores indicating a relative importance of each highlighted event, and/or in any other suitable manner), whereas in instances where process 600 determines that the condensed version of the media content item is to be half an hour in duration, process 600 can select a second subset of highlighted events that is larger than the first subset. Process 600 can then generate a condensed media content item by concatenating portions of the media content item that span each of the selected highlighted events.

In some embodiments, process 600 can identify the contextual interfaces based on information provided by a creator of the media content item. For example, as described above, in some embodiments, the information provided by the creator of the media content item can include metadata indicating time points at which items, actors, or events of interest appear in or occur in the media content item. As a more particular example, in some embodiments, the creator of the media content item can identify characters or actors appearing in the media content item at particular time points and can indicate that a contextual interface presenting information about the character or actor is to be available for a duration of time near the particular time points. As another more particular example, in some embodiments, the creator of the media content item can identify a song included in the media content item at a particular time point and can indicate that a contextual interface presenting information about the song (e.g., identifying information for the song, a link to buy the song, and/or any other suitable information) is to be available for a duration of time near the particular time the song is included in the media content item. In some embodiments, the creator of the media content item can use a template contextual interface to create contextual interfaces specific to the media content item that are to be made available to a viewer of the media content item at particular times. In some such embodiments, process 600 can identify the one or more contextual interfaces by identifying contextual interfaces the creator of the media content item indicated at a current time point during presentation of the media content item.

Note that the contextual interfaces described above and shown in FIGS. 1A, 1B, 2A, 2B, 3A, and 3B are merely examples. In some embodiments, process 600 can identify any suitable type of contextual interface, and the contextual interface can have any suitable type of appearance. For example, in some embodiments, process 600 can identify any suitable contextual interface specified by a creator of the media content item, as described above in more detail above. As another example, in some embodiments, process 600 can identify any suitable contextual interface associated with any suitable third-party, such as a third-party application for image sharing, content sharing, social networking, and/or any other suitable application.

Process 600 can cause the one or more contextual interfaces to be presented on the user device at 608 in any suitable manner. For example, as shown in and described above in connection with FIGS. 1A, 1B, 2A, 2B, 3A, and 3B, the contextual interfaces can be presented adjacent to a presentation of the media content item. As a more particular example, in some embodiments, a media player window in which the media content item can be minimized (e.g., to take up half of a display of the user device, and/or minimized in any other suitable manner), and the contextual interface(s) can be presented in a remaining portion of the display, as shown in FIGS. 1A, 1B, 2A, 2B, 3A, and 3B. As another example, in some embodiments, a contextual interface can be presented with an indication of a number of other contextual interfaces that are also available, as shown in and described above in connection with FIGS. 1A and 1B.

Process 600 can receive a user interaction associated with the contextual interfaces at 610. For example, in some embodiments, the user interaction can be a swipe on a touchscreen of the user device to cause a different contextual interface to be presented. As another example, in some embodiments, the user interaction can be a selection of a portion of a currently presented contextual interface that causes additional or different content to be presented on the user device. As a more particular example, in some embodiments, the user interaction can be a selection of a link included in a contextual interface, a selection of informational text or graphics included in a contextual interface, and/or any other suitable content in a contextual interface. As another more particular example, in some embodiments, the user interaction can be a selection of a user interface control to manipulate playback of the media content item, such as a selection of an option to replay an identified highlight of the media content item, as described above. As yet another example, in some embodiments, the user interaction can include a message entered on the user device that is to be included in a messaging interface presented in a contextual interface. As still another example, in some embodiments, the user interaction can include a request to update messages presented in a messaging interface presented in a contextual interface.

In some embodiments, a user interaction can cause particular time points of the media content item to be highlighted to the user. For example, in instances where the contextual interface presents information about an actor or character in a television show, selection of the information within the contextual interface can cause process 600 to highlight (e.g., in a timeline associated with the media content item) time points at which the actor or character appears. As another example, in instances where the contextual interface presents information about a particular object or item in a television show (e.g., a particular ingredient in a cooking show, and/or any other suitable object or item, selection of the information within the contextual interface can cause process 600 to highlight time points at which the object or item is discussed or shown within the media content item. In some embodiments, process 600 can cause the time points to be highlighted based on metadata associated with the media content item that indicates time points where particular actors, characters, objects, items, events, etc. occur.

Process 600 can update the contextual interfaces and/or the presentation of the media content item at 612. In some embodiments, process 600 can update the contextual interfaces and/or the presentation of the media content item based on the received user interaction. For example, in instances where the user interaction is a request to present a different contextual interface from a group of available contextual interfaces (e.g., a swipe left, a swipe right, and/or any other suitable user interaction), process 600 can cause a next contextual interface in the group of available contextual interfaces to be presented. As another example, in instances where the user interaction is a selection of a link of another content item included in a contextual interface, process 600 can cause content associated with the selected link and/or a page associated with a selected content item to be presented. As a more particular example, in some embodiments, process 600 can cause an application associated with the selected link or selected content item to be opened based on the user interaction. As another more particular example, in some embodiments, process 600 can cause a browser window to be opened and can cause content associated with a selected link or a page associated with a selected content item to be presented within the browser window. As a specific example, in instances where a selected link is a link to buy a particular song indicated in a contextual interface, process 600 can cause an application for buying and playing songs to be opened on the user device. As another specific example, in instances where the user interaction is a selection of a content item presenting information about a particular actor appearing in the media content item, process 600 can cause a browser window to be opened and can cause the browser to navigate to a web page from which the information was collated to be opened (e.g., a web page corresponding to a web-based encyclopedia, a web page corresponding to a search query associated with the actor, and/or any other suitable page).

Note that, in some embodiments, process 600 can update the contextual interfaces based on any other suitable information. For example, in some embodiments, process 600 can update the contextual interfaces based on metadata associated with the media content item that indicates time points at which particular events occur (e.g., scored goals, dramatic events in a television program, and/or any other suitable events), particular actors or characters appear, particular objects or items (e.g., particular ingredients in a cooking show, particular clothing items, and/or any other suitable type of objects or items), particular geographic locations, and/or any other suitable information occurs within the media content item. As a more particular example, in some embodiments, process 600 can determine that the metadata indicates that a particular actor or character is to appear during an upcoming portion of presentation of the media content item (e.g., within the next minute, and/or any other suitable portion), and can update the contextual interfaces to present information about the particular actor or character.

In some embodiments, in instances where the user interaction is a user input to manipulate playback of the media content item, process 600 can update a presentation of the media content item. For example, in instances where the user interaction is selection of an input to present a highlight of the media content item (e.g., replay a goal scored in a game, and/or replay any other suitable highlight of the media content item), process 600 can cause a portion of the media content item that includes the highlight to be presented in any suitable manner. As a more particular example, in some embodiments, process 600 can cause presentation of the media content item to be paused and can cause the portion of the media content item that includes the highlight to be presented within a media player widow in which the media content item was being presented. In some embodiments, process 600 can resume presentation of the media content item after presenting the highlight.

At 614, process 600 can receive a user input to inhibit presentation of the contextual interfaces. For example, in some embodiments, the user input can be a selection of an icon to close one or more presented contextual interfaces. As another example, in some embodiments, the user input can include a user swiping the contextual interfaces off a display screen associated with the user device (e.g., swiping down, and/or swiping in any other suitable direction).

At 616, process 600 can continue presenting the media content item. In some embodiments, process 600 can resume presenting the media content item in any suitable manner, such as in a full-screen view that maximizes the media player window within a display associated with the user device.

In some embodiments, process 600 can loop back to block 604 and can receive another user input to display contextual interfaces on the user device.

In some embodiments, at least some of the above described blocks of the process of FIG. 6 can be executed or performed in any order or sequence not limited to the order and sequence shown in and described in connection with the figures. Also, some of the above blocks of FIG. 6 can be executed or performed substantially simultaneously where appropriate or in parallel to reduce latency and processing times. Additionally or alternatively, some of the above described blocks of the process of FIG. 6 can be omitted.

In some embodiments, any suitable computer readable media can be used for storing instructions for performing the functions and/or processes herein. For example, in some embodiments, computer readable media can be transitory or non-transitory. For example, non-transitory computer readable media can include media such as non-transitory forms of magnetic media (such as hard disks, floppy disks, and/or any other suitable magnetic media), non-transitory forms of optical media (such as compact discs, digital video discs, Blu-ray discs, and/or any other suitable optical media), non-transitory forms of semiconductor media (such as flash memory, electrically programmable read-only memory (EPROM), electrically erasable programmable read-only memory (EEPROM), and/or any other suitable semiconductor media), any suitable media that is not fleeting or devoid of any semblance of permanence during transmission, and/or any suitable tangible media. As another example, transitory computer readable media can include signals on networks, in wires, conductors, optical fibers, circuits, any suitable media that is fleeting and devoid of any semblance of permanence during transmission, and/or any suitable intangible media.

In situations in which the systems described herein collect personal information about users, or make use of personal information, the users may be provided with an opportunity to control whether programs or features collect user information (e.g., information about a user's social network, social actions or activities, profession, a user's preferences, or a user's current location). In addition, certain data may be treated in one or more ways before it is stored or used, so that personal information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by a content server.

Accordingly, methods, systems, and media for presenting contextual information in connection with media content are provided.

Although the invention has been described and illustrated in the foregoing illustrative embodiments, it is understood that the present disclosure has been made only by way of example, and that numerous changes in the details of implementation of the invention can be made without departing from the spirit and scope of the invention, which is limited only by the claims that follow. Features of the disclosed embodiments can be combined and rearranged in various ways.

What is claimed is:

1. A method comprising:
   causing a media content item to be presented on a user device;
   receiving, at a first time point from a user of the user device, a first user input to display one or more contextual interfaces that present information related to the media content item being presented on the user device;
   identifying a first contextual interface having a first type of contextual information corresponding to first metadata associated with the first time point of the media content item and a second contextual interface having a second type of contextual information, wherein the first contextual interface includes an option to replay at least one portion of the media content item corresponding to the first metadata associated with the first time point of the media content item;

causing the media content item to continue being presented in a first portion of a display of the user device;

causing one of the first contextual interface and the second contextual interface to be presented in a second portion of the display of the user device concurrently with a navigational indicator that indicates that contextual interfaces can be switched between at least the first contextual interface and the second contextual interface within the second portion of the display; and responsive to receiving a second user input selecting the option to replay the at least one portion of the media content item:

pausing presentation of the media content item within the first portion of the display;

causing the at least one portion of the media content item to be presented in the first portion of the display; and after the at least one portion of the media content item is presented in the first portion of the display, resuming presentation of the media content item in the first portion of the display from where the presentation of the media content item was paused.

2. The method of claim 1, wherein the second contextual interface allows a user of the user device to participate in a chat with other users viewing the media content item.

3. The method of claim 1, wherein the second contextual interface allows a user of the user device to participate in a group chat with other users in a group of users and wherein the group chat was initiated by at least one user in the group of users.

4. The method of claim 1, wherein the second contextual interface aggregates one or more messages received in connection with a social service that are determined to be relevant to the media content item.

5. The method of claim 1, further comprising:

identifying, at a second time point, an update to the first contextual interface based on second metadata associated with the second time point of the media content item; and modifying the first contextual interface based on the update identified at the second time point.

6. The method of claim 5, further comprising:

in response to receiving an additional user input, causing the second contextual interface to replace the first contextual interface in the second portion of the display of the user device while continuing to present the media content item in the first portion of the display; and updating the navigational indicator.

7. The method of claim 1, further comprising detecting an item that appears in the media content item at the first time point, wherein the first contextual interface presents information relating to the item.

8. The method of claim 1, wherein the second contextual interface includes a messaging interface for presenting messages received from one or more users other than the user of the user device.

9. The method of claim 1, wherein the first metadata includes a score indicating a likelihood that the user of the user device will be interested in the content included in the media content item at the first time point.

10. The method of claim 1, wherein the first contextual interface and the second contextual interface are included in a plurality of contextual interfaces, the method further comprising:

modifying the plurality of contextual interfaces available for presentation by the user device based on user engagement information associated with the first contextual interface.

11. A system for presenting contextual information in connection with media content, the system comprising:

a hardware processor that:

causes a media content item to be presented on a user device;

receives, at a first time point from a user of the user device, a user input to display one or more contextual interfaces that present information related to the media content item being presented on the user device;

identifies a first contextual interface having a first type of contextual information corresponding to first metadata associated with the first time point of the media content item and a second contextual interface having a second type of contextual information, wherein the first contextual interface includes an option to replay at least one portion of the media content item corresponding to the first metadata associated with the first time point of the media content item;

causes the media content item to continue being presented in a first portion of a display of the user device;

causes one of the first contextual interface and the second contextual interface to be presented in a second portion of the display of the user device concurrently with a navigational indicator that indicates that contextual interfaces can be switched between at least the first contextual interface and the second contextual interface within the second portion of the display; and responsive to receiving a second user input selecting the option to replay the at least one portion of the media content item:

pauses presentation of the media content item within the first portion of the display;

causes the at least one portion of the media content item to be presented in the first portion of the display; and after the at least one portion of the media content item is presented in the first portion of the display, resumes presentation of the media content item in the first portion of the display from where the presentation of the media content item was paused.

12. The system of claim 11, wherein the second contextual interface allows a user of the user device to participate in a chat with other users viewing the media content item.

13. The system of claim 11, wherein the second contextual interface allows a user of the user device to participate in a group chat with other users in a group of users and wherein the group chat was initiated by at least one user in the group of users.

14. The system of claim 11, wherein the second contextual interface aggregates one or more messages received in connection with a social service that are determined to be relevant to the media content item.

15. The system of claim 11, wherein the hardware processor also:

identifies, at a second time point, an update to the first contextual interface based on second metadata associated with the second time point of the media content item; and modifies the first contextual interface based on the update identified at the second time point.

16. The system of claim 15, wherein the hardware processor also:
in response to receiving an additional user input, causes the second contextual interface to replace the first contextual interface in the second portion of the display of the user device while continuing to present the media content item in the first portion of the display, and updates the navigation indicator.

17. The system of claim 11, wherein the hardware processor also detects an item that appears in the media content item at the first time point, wherein the first contextual interface presents information relating to the item.

18. The system of claim 11, wherein the second contextual interface includes a messaging interface for presenting messages received from one or more users other than the user of the user device.

19. The system of claim 11, wherein the first metadata includes a score indicating a likelihood that the user of the user device will be interested in the content included in the media content item at the first time point.

20. The system of claim 11,
wherein the first contextual interface and the second contextual interface are included in a plurality of contextual interfaces, and
wherein the hardware processor also modifies the plurality of contextual interfaces available for presentation by the user device based on user engagement information associated with the first contextual interface.

21. A non-transitory computer-readable medium containing computer executable instructions that, when executed by a processor, cause the processor to:
cause a media content item to be presented on a user device;
receive, at a first time point from a user of the user device, a user input to display one or more contextual interfaces that present information related to the media content item being presented on the user device;
identify a first contextual interface having a first type of contextual information corresponding to first metadata associated with the first time point of the media content item and a second contextual interface having a second type of contextual information, wherein the first contextual interface includes an option to replay at least one portion of the media content item corresponding to the first metadata associated with the first time point of the media content item;
cause the media content item to continue being presented in a first portion of a display of the user device;
cause one of the first contextual interface and the second contextual interface to be presented in a second portion of the display of the user device concurrently with a navigational indicator that indicates that contextual interfaces can be switched between at least the first contextual interface and the second contextual interface within the second portion of the display; and
responsive to receiving a second user input selecting the option to replay the at least one portion of the media content item:
pause presentation of the media content item within the first portion of the display;
cause the at least one portion of the media content item to be presented in the first portion of the display; and
after the at least one portion of the media content item is presented in the first portion of the display, resume presentation of the media content item in the first portion of the display from where the presentation of the media content item was paused.

* * * * *